(12) United States Patent
Panchaksharaiah et al.

(10) Patent No.: US 11,711,577 B2
(45) Date of Patent: Jul. 25, 2023

(54) METHODS AND SYSTEMS FOR IMPLEMENTING A LOCKED MODE FOR VIEWING MEDIA ASSETS

(71) Applicant: Rovi Guides, Inc., San Jose, CA (US)

(72) Inventors: Vishwas Sharadanagar Panchaksharaiah, Tumkur District (IN); Vikram Makam Gupta, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/940,830

(22) Filed: Sep. 8, 2022

(65) Prior Publication Data

US 2023/0143038 A1 May 11, 2023

Related U.S. Application Data

(63) Continuation of application No. 17/320,044, filed on May 13, 2021, now Pat. No. 11,470,391, which is a continuation of application No. 16/816,684, filed on Mar. 12, 2020, now Pat. No. 11,039,211, which is a continuation of application No. 16/190,332, filed on Nov. 14, 2018, now Pat. No. 10,602,222, which is a continuation of application No. 14/870,212, filed on Sep. 30, 2015, now Pat. No. 10,171,872.

(51) Int. Cl.
| | |
|---|---|
| *H04N 21/454* | (2011.01) |
| *H04N 21/845* | (2011.01) |
| *H04N 21/45* | (2011.01) |
| *H04N 21/258* | (2011.01) |
| *H04N 21/475* | (2011.01) |
| *H04N 21/472* | (2011.01) |
| *H04N 21/482* | (2011.01) |
| *H04N 21/6543* | (2011.01) |

(52) U.S. Cl.
CPC ..... *H04N 21/454* (2013.01); *H04N 21/25891* (2013.01); *H04N 21/4532* (2013.01); *H04N 21/472* (2013.01); *H04N 21/4751* (2013.01); *H04N 21/4821* (2013.01); *H04N 21/6543* (2013.01); *H04N 21/8453* (2013.01)

(58) Field of Classification Search
CPC ......... H04N 21/25891; H04N 21/4532; H04N 21/454; H04N 21/472; H04N 21/4751; H04N 21/4821; H04N 21/6543; H04N 21/8453
See application file for complete search history.

(56) References Cited

U.S. PATENT DOCUMENTS

| | | |
|---|---|---|
| 5,969,748 A | 10/1999 | Casement et al. |
| 6,141,488 A | 10/2000 | Knudson et al. |
| (Continued) | | |

*Primary Examiner* — Nicholas T Corbo
(74) *Attorney, Agent, or Firm* — Haley Guiliano LLP

(57) ABSTRACT

Methods and systems that provide an interactive media guidance application having a locked mode for viewing media assets. In the locked mode, the interactive media guidance application may provide media assets suited to a certain audience. The interactive media guidance application may determine suitable media assets for the locked mode based on media assets viewed by other users having characteristics similar to the user of the interactive media guidance application. In the locked mode, the interactive media guidance application may allow access to only certain media assets and/or limit the time period for which the media assets are presented.

20 Claims, 10 Drawing Sheets

(56) References Cited

U.S. PATENT DOCUMENTS

| | | |
|---|---|---|
| 6,898,762 B2 | 5/2005 | Ellis et al. |
| 7,362,999 B2 | 4/2008 | Petschke et al. |
| 7,849,477 B2 | 12/2010 | Cristofalo et al. |
| 7,921,440 B1 | 4/2011 | Kolde et al. |
| 8,640,190 B1 | 1/2014 | Banerjee |
| 8,799,954 B1 | 8/2014 | Ellis |
| 8,984,550 B2 | 3/2015 | Craner et al. |
| 9,106,780 B1 | 8/2015 | Newstadt et al. |
| 9,148,698 B1 | 9/2015 | Jaini et al. |
| 10,171,872 B2 | 1/2019 | Panchaksharaiah et al. |
| 10,602,222 B2 | 3/2020 | Panchaksharaiah et al. |
| 11,039,211 B2 | 6/2021 | Panchaksharaiah et al. |
| 11,470,391 B2 | 10/2022 | Panchaksharaiah et al. |
| 2003/0126600 A1 | 7/2003 | Heuvelman |
| 2005/0028191 A1 | 2/2005 | Sullivan et al. |
| 2007/0157242 A1 | 7/2007 | Cordray et al. |
| 2009/0116379 A1 | 5/2009 | Rahman |
| 2013/0263001 A1 | 10/2013 | Doronichev et al. |
| 2014/0259124 A1 | 9/2014 | Petersen et al. |
| 2014/0359647 A1 | 12/2014 | Shoemake et al. |
| 2016/0112760 A1* | 4/2016 | Kosseifi ........... H04N 21/44008 725/28 |
| 2017/0094352 A1 | 3/2017 | Panchaksharaiah et al. |
| 2019/0158919 A1 | 5/2019 | Panchaksharaiah et al. |
| 2020/0213672 A1 | 7/2020 | Panchaksharaiah et al. |
| 2021/0281917 A1 | 9/2021 | Panchaksharaiah et al. |

\* cited by examiner

600

| | |
|---|---|
| 600 | ... |
| 601 | Initialization Subroutine |
| 602 | ... |
| 603 | //Routine to Determine Whether a Specified User has Characteristics Similar to a Plurality of Users: |
| 604 | |
| 605 | Receive Instances of Characteristics for each of the Specified User and the Plurality of Users |
| 606 | For each Instance of Characteristics for the Specified User: |
| 607 | A = Accessed Value of the Instance of Characteristics for each of the Specified User |
| 608 | B = Accessed Value of the Instance of Characteristics for each of the Plurality of Users |
| 609 | If (A==B) |
| 610 | Execute Subroutine to Increment a Counter for Number of Overlapping Characteristics between the Specified User and the Plurality of Users Using Processing Circuitry |
| 611 | Execute Subroutine to Determine Whether the Number of Overlapping Characteristics between the Specified User and the Plurality of Users Exceeds a Threshold Using Processing Circuitry |
| 612 | ... |
| 613 | Termination Subroutine |
| 614 | ... |

801 Initialization Subroutine

802 ...

803 //Routine to Determine Whether a Specified User has Characteristics Similar to a Plurality of Users:

804

805 Receive Instances of Characteristics for the Specified User

806 For each Instance of Characteristics for the Specified User:

807     Query Database Containing Values of Characteristics for a Plurality of Users for Entries Matching the Characteristic for the Specified User 808     If (Number of Matching Entries > 0)

809         Retrieve Value of the Characteristic for the Plurality of Users from Database Entries Matching the Characteristic for the Specified User 810         Execute Subroutine to Increment a Counter for Number of Overlapping Characteristics between the Specified User and the Plurality of Users Using Processing Circuitry 811 Execute Subroutine to Determine Whether the Number of Overlapping Characteristics between the Specified User and the Plurality of Users Exceeds a Threshold Using Processing Circuitry

812 ...

813 Termination Subroutine

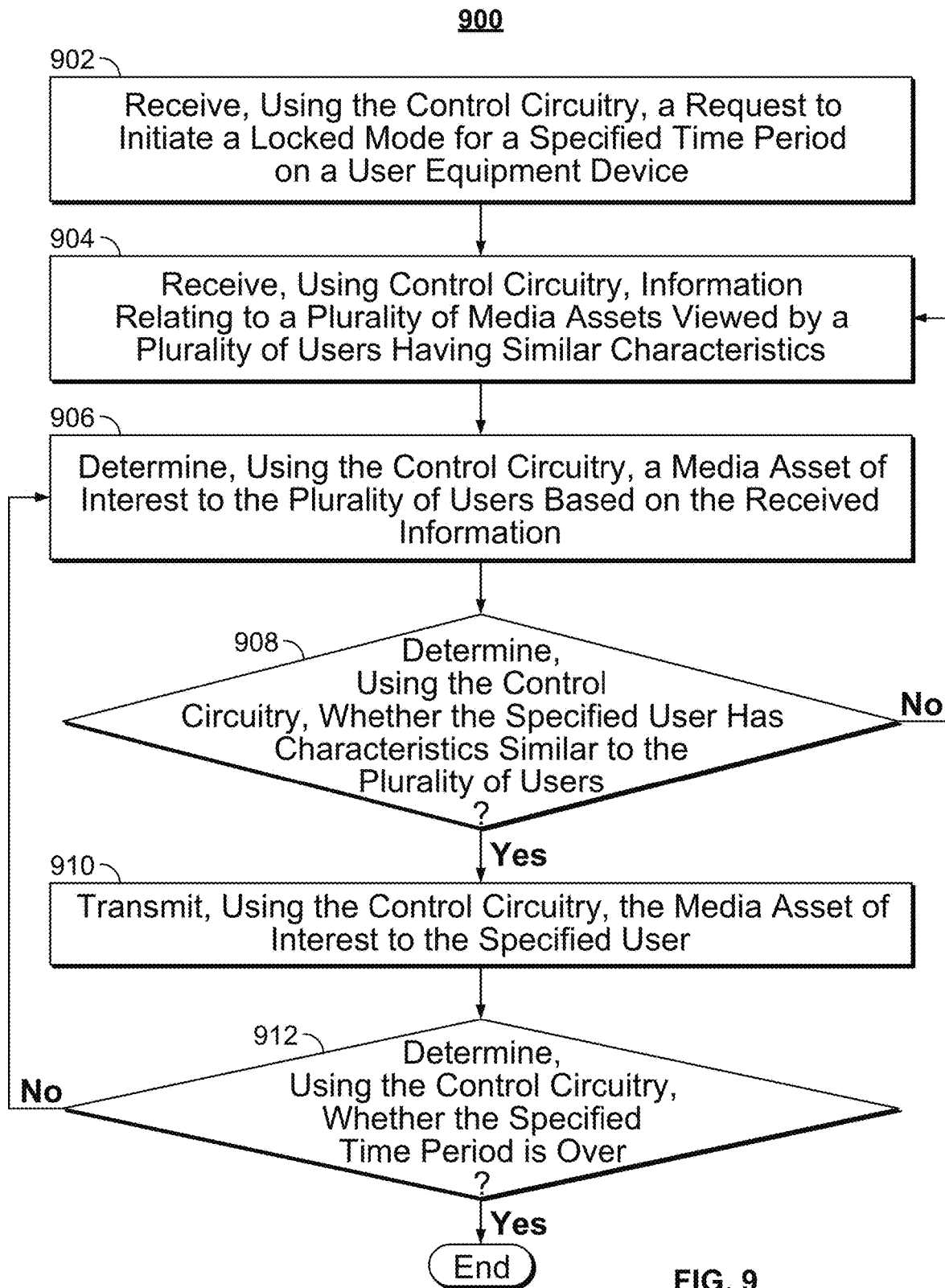

METHODS AND SYSTEMS FOR IMPLEMENTING A LOCKED MODE FOR VIEWING MEDIA ASSETS

CROSS-REFERENCE TO RELATED APPLICATIONS

This application is a continuation of U.S. patent application Ser. No. 17/320,044, filed May 13, 2021, which is a continuation of U.S. patent application Ser. No. 16/816,684 (now U.S. Pat. No. 11,039,211), filed Mar. 12, 2020, which is a continuation of U.S. patent application Ser. No. 16/190,332 (now U.S. Pat. No. 10,602,222), filed Nov. 14, 2018, which is a continuation of U.S. patent application Ser. No. 14/870,212 (now U.S. Pat. No. 10,171,872), filed Sep. 30, 2015, which are hereby incorporated by reference herein in their entireties.

BACKGROUND

In conventional systems, users may access a wide variety of media content. In some cases, certain media content may not be appropriate for all users. For example, media content featuring violence may not be appropriate for children under a particular age. To prevent users from viewing objectionable content, many media systems include parental control features. Such parental control features often allow a user, such as a parent of a child, to block media content based on one or more criteria, such as a source or a content rating of the media content. While such media systems are helpful in blocking media content specified by the parent, such media systems do not allow for blocking potentially objectionable media content that the parent is not aware of, nor do such systems allow for limiting the child's exposure to media content to a specified period of time.

SUMMARY

Accordingly, methods and systems are disclosed herein for an interactive media guidance application implemented on a user equipment device that provides a locked mode for a user viewing media assets. Using parental control features in an interactive media guidance application, a user can block particular media assets, such as a program, or particular media sources, such as a channel. However, the number of media assets and media sources continues to grow and makes it difficult for parents to keep themselves aware of inappropriate media content that they should block from their children. It is also difficult for parents to control the amount of time their children spend watching media content without constantly monitoring their viewing habits. For example, parents may not want their children to be watching too much media content on a given day or to be watching any media content at all during examination periods.

The methods and systems disclosed herein address these concerns by providing an interactive media guidance application having a locked mode for viewing media assets. In the locked mode, the interactive media guidance application may provide media assets suited to a certain audience. The interactive media guidance application may determine suitable media assets based on media assets viewed by other users having characteristics similar to the user of the interactive media guidance application. The interactive media guidance application may limit the time period for which the media assets are presented.

In some embodiments, a parent may activate the interactive media guidance application's locked mode for a child to view media assets suitable for the child while the parent is unavailable to supervise the child. The interactive media guidance application may determine media assets suitable for the child based on media assets viewed by other users, e.g., other children, having characteristics similar to the child. Optionally, the parent may activate the locked mode to limit viewing of appropriate media assets by the child to a specified period of time.

For example, a parent may need to leave their child unsupervised while they leave their home to run errands. The parent may activate the locked mode to present media assets via the interactive media guidance application, implemented on the user equipment device, and leave their child to view the media assets being presented in the locked mode. The parent may optionally specify a period of time after which the interactive media guidance application restricts access to the user equipment device. For example, the interactive media guidance application may turn off the user equipment device after the specified period of time is over. The parent may have instructed the child to complete their homework after finishing the media content being presented. The parent may enforce that by having the interactive media guidance application turn off the user equipment device so the child cannot continue watching media content against the parent's wishes. The interactive media guidance application may lock out other functionality as well while the locked mode is activated. For example, the interactive media guidance application may allow the child to control volume functions but not allow the child to switch channels or another media source.

The interactive media guidance application may crowdsource information regarding suitable media assets for the child to view based on media assets viewed by other users having characteristics similar to the child. The interactive media guidance application may retrieve characteristics of the user from a user profile. For example, the characteristics of the user may include age, gender, favorite programs, and other suitable characteristics. The parent may specify a parental control rating in the child's user profile to assess suitability of media assets. For example, the parent may specify that no violence is appropriate for their child even though a media asset with some violence may be considered generally suitable for a child of similar age. The interactive media guidance application may connect to a remote server to retrieve information regarding suitable media assets for the child. The interactive media guidance application may request media assets viewed by other users having characteristics similar to the child's characteristics.

For example, the interactive media guidance application may receive information regarding media assets suitable for the child from a remote server in the order below:

5 pm-6 pm: channel "Cartoon Network"
    6 pm-7 pm: channel "National Geographic"
    7 pm-8 pm: channel "ABC" program "America's Funniest Home Videos"

In this example, the interactive media guidance application may respond only to commands received from the remote server and disregard any commands from the child via, e.g., the remote for the user equipment device. At 5 pm, the remote server may send a command to the interactive media guidance application to tune to channel "Cartoon Network." At 6 pm, the remote server may send another command to the interactive media guidance application to tune to channel "National Geographic." At 7 pm, the remote server may send yet another command to the interactive media guidance application to tune to channel "ABC." Finally, at 8 pm, the remote server may send a final command to the interactive media guidance application to power off the user equipment device so the child may complete their homework.

In another example, the interactive media guidance application may receive information regarding media assets suitable for the child from a remote server in the order below:

5 pm-6 pm: channel "Cartoon Network" or channel "ESPN" or channel "Pogo"

6 pm-7 pm: channel "National Geographic" or "Discovery"

7 pm-8 pm: channel "ABC" program "America's Funniest Home Videos"

In this example, the interactive media guidance application may respond to commands received from the remote server and only respond to commands to change channel from the child via, e.g., the remote for the user equipment device. At 5 pm, the remote server may send a command to the interactive media guidance application to tune to channel "Cartoon Network." The child may change channels to "ESPN" or "Pogo" but not to any other channel. The interactive media guidance may also disable other functionality to prevent the child from viewing media assets other than those received from the remote server. At 6 pm, the remote server may send another command to the interactive media guidance application to tune to channel "National Geographic." The child may switch channels between "National Geographic" and "Discovery" but not to any other channel. At 7 pm, the remote server may send yet another command to the interactive media guidance application to tune to channel "ABC." Finally, at 8 pm, the remote server may send a final command to the interactive media guidance application to power off the user equipment device so the child may complete their homework.

By providing the parent with the locked mode option, the interactive media guidance application allows the parent to have peace of mind that their child is viewing media content suitable for their age without having to predetermine which particular media assets the child should view. The parent is free from monitoring the child and need not be concerned about the child watching inappropriate content. Additionally, the interactive media guidance application provides the parent control over the entire time period the child spends viewing media content so that, if desired, the parent can determine the suitable amount of time the child should spend viewing the media assets. The parent has the liberty to control the amount of time the child spends viewing the media assets even if the parent is absent at that time.

In some embodiments, the interactive media guidance application collects statistics about media content and duration of media content being watched on a weekly or monthly basis. For example, while the parent is present to monitor the child's viewing, the interactive media guidance application can collect information regarding media assets that are suitable for the child to view. For example, suitable media assets may include "Tom and Jerry," "News," and "America's Funniest Home Videos." The statistics may also include information on duration of time spent on viewing the media assets. For example, in a given week the child may have viewed "Tom and Jerry," "News," and "America's Funniest Home Videos" for 10 hours, 4 hours, and 9 hours, respectively. This information may be uploaded to the remote server along with the child's characteristics from the user profile. Information collected from multiple user equipment devices can be retrieved when another parent wishes to crowd-source information regarding media assets suitable to present to their child for viewing in the interactive media guidance application's locked mode.

In some embodiments, the interactive media guidance may implement a locked mode for viewing media assets suitable for elderly people. It may be difficult for elderly people to remember channels or timings for their favorite programs. Alerts to tune to certain channels on their television or mobile device may still be a challenge for the elderly. The interactive media guidance application may create a playlist of an elderly person's favorite programs based on their user profile. Additionally, the interactive media guidance application may crowd-source information regarding suitable media assets for the elderly person to view based on media assets viewed by other users having characteristics similar to the elderly person. The interactive media guidance application may receive information regarding media assets suitable for the elderly person in a manner similar to the information received in the example for the child discussed above. In this example, the interactive media guidance application may respond to commands received from the remote server to tune the channel to the elderly person's favorite programs at their preset times according to the received information. The elderly person or a family member may activate the interactive media guidance application's locked mode for the elderly person to view media assets without needing to tune to another television channel or to change to another source for the media assets they wish to view.

In some aspects, the interactive media guidance application is implemented on control circuitry. The interactive media guidance application receives a request to initiate a locked mode for a specified time period on a user equipment device. The request indicates that a specified user of the user equipment device is only allowed access to media assets selected for the locked mode during the specified time period. For example, a parent may need to leave their child unsupervised while they leave their home to run errands. The parent may initiate the locked mode for their child to view media assets for two hours before the child has to start working on their homework. By providing the parent with the locked mode option, the interactive media guidance application allows the parent to have peace of mind that their child is viewing media content suitable for their age and that the child will not spend an excessive amount of time viewing the media assets.

The interactive media guidance application receives information relating to media assets viewed by other users having similar characteristics. For example, the interactive media guidance application may receive information from a remote server relating to media assets viewed by other children of similar age to each other.

The interactive media guidance application determines a media asset of interest to the other users based on the received information. For example, the interactive media guidance application may determine that "ABC" program "America's Funniest Home Videos" is a media asset of interest to the other children having similar characteristics to each other as the child based on the received information.

The interactive media guidance application determines whether the specified user has characteristics similar to the other users. For example, the interactive media guidance application may retrieve characteristics of the child from a user profile for the child and compare the characteristics to the characteristics of the other children. The characteristics of the user may include age, gender, favorite programs, and other suitable characteristics. The other children may be of similar age, e.g., years 7-9. The child may be 8 years old. As such, the interactive media guidance application may compare and determine that the 8-year old child is of similar age to the other children.

The interactive media guidance application transmits the media asset of interest to the specified user in response to determining that the specified user has characteristics similar to the other users. For example, once the interactive media guidance application determines the child's characteristics are similar to other children, the interactive media guidance application may transmit the media asset of interest to the child, e.g., for display on a television display device.

In some aspects, the request to initiate the locked mode received by the interactive media guidance application includes a specified type of content and/or a parental control rating for media assets transmitted during the specified time period. For example, the parent may specify that no violence is appropriate for their child even though a media asset with some violence may be considered generally suitable for a child of similar age.

In some aspects, the interactive media guidance application receives the information relating to the media assets, including a title, a play length, a media source, and/or a parental control rating for each media asset. For example, information for a media asset may include title "America's Funniest Home Videos," play length "1 hour," media source "ABC," and parental control rating "TV-PG."

In some aspects, the interactive media guidance application does not allow the specified user to access any other functionality on the user equipment device. For example, while the locked mode is activated, the interactive media guidance application may lock out all other functionality such as controlling volume functions or switching to another channel or media source.

In some aspects, the interactive media guidance application determines whether the specified user has characteristics similar to the other users by receiving a first set of characteristics for the other users and receiving a second set of characteristics for the specified user. The interactive media guidance application compares the first set of characteristics and the second set of characteristics to determine a number of overlapping characteristics. The interactive media guidance application determines whether the number of overlapping characteristics exceeds a threshold. For example, the interactive media guidance application may receive characteristics of the child from a user profile for the child and compare the characteristics to the received characteristics for the other children. The characteristics of the user may include age, gender, favorite programs, and other suitable characteristics. The other children may be of similar age, e.g., boys of age 7-9. The child may be a boy that is 8 years old. The threshold may be set to one overlapping characteristic. As such, the interactive media guidance application may compare and determine that the 8-year old child is of similar age and gender to the other children and that there are two overlapping characteristics exceeding the threshold.

In some aspects, the interactive media guidance application determines that the media asset of interest has a play length less than or equal to the specified time period. The interactive media guidance application transmits the media asset of interest to the specified user in response to determining that the media asset of interest has a play length less than or equal to the specified time period and that the specified user has characteristics similar to the plurality of users. The interactive media guidance application decrements the specified time period by a value equal to the play length of the media asset of interest. For example, the parent may have specified a time period of one hour for the locked mode to view media assets. The interactive media guidance application may determine two media assets of interest based on information received regarding the other users having similar characteristics. The interactive media guidance application may determine that the first media asset of interest has a play length greater than the specified time period while the second media asset of interest has a play length less than or equal to the specified time period. The interactive media guidance application may transmit the second media asset of interest to the child for viewing in response to determining that the media asset fits in the specified time period for the locked mode. The interactive media guidance application decrements the specified time period by a value equal to the play length of the media asset of interest. For example, the specified time period of one hour is decremented by 30 minutes due to the media asset viewed by the child to ensure the total viewing time does not exceed one hour.

In some aspects, the interactive media guidance application restricts access to the user equipment device when the specified time period is over. For example, the interactive media guidance application may turn off the user equipment device after the specified period of time is over. The parent may have instructed the child to complete their homework after finishing the media content being presented. The parent may enforce that by having the interactive media guidance application turn off the user equipment device so the child cannot continue watching media content against the parent's wishes.

In some aspects, the other users represent children viewing the media assets under supervision of their respective parents. The specified user of the interactive media guidance application is a child with characteristics similar to the plurality of users. The request to initiate the locked mode for the specified time period on the user equipment device is input by a parent of the specified user.

In some aspects, the interactive media guidance application determines an additional media asset of interest to the other users based on the received information. The interactive media guidance application generates for display an option for the specified user to select the initial media asset of interest and/or the additional media asset of interest. For example, the interactive media guidance application may receive information regarding media assets suitable for the child to be programs on channel "Cartoon Network" or channel "ESPN" or channel "Pogo." The interactive media guidance application may present an option to the child to select any one of the suitable programs for viewing. The interactive media guidance application may respond to commands received from the remote server and only respond to commands to change the channel from the child via, e.g., the remote for the user equipment device.

In some aspects, the other users represent elderly people viewing the plurality of media assets, and the specified user of the interactive media guidance application is an elderly person with characteristics similar to the other users. The request to initiate the locked mode for the specified time period on the user equipment device is input by a family member of the specified user.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode of illustrative steps for determining whether a specified user has characteristics similar to characteristics for a plurality of users in accordance with some embodiments of the disclosure;

FIG. 8 is pseudocode of an illustrative process for using a database to determine whether a specified user has characteristics similar to characteristics for a plurality of users in accordance with some embodiments of the disclosure;

FIG. 9 is a flowchart of an illustrative process for implementing a locked mode for viewing media assets in accordance with some embodiments of the disclosure;

DETAILED DESCRIPTION

Figure 1:
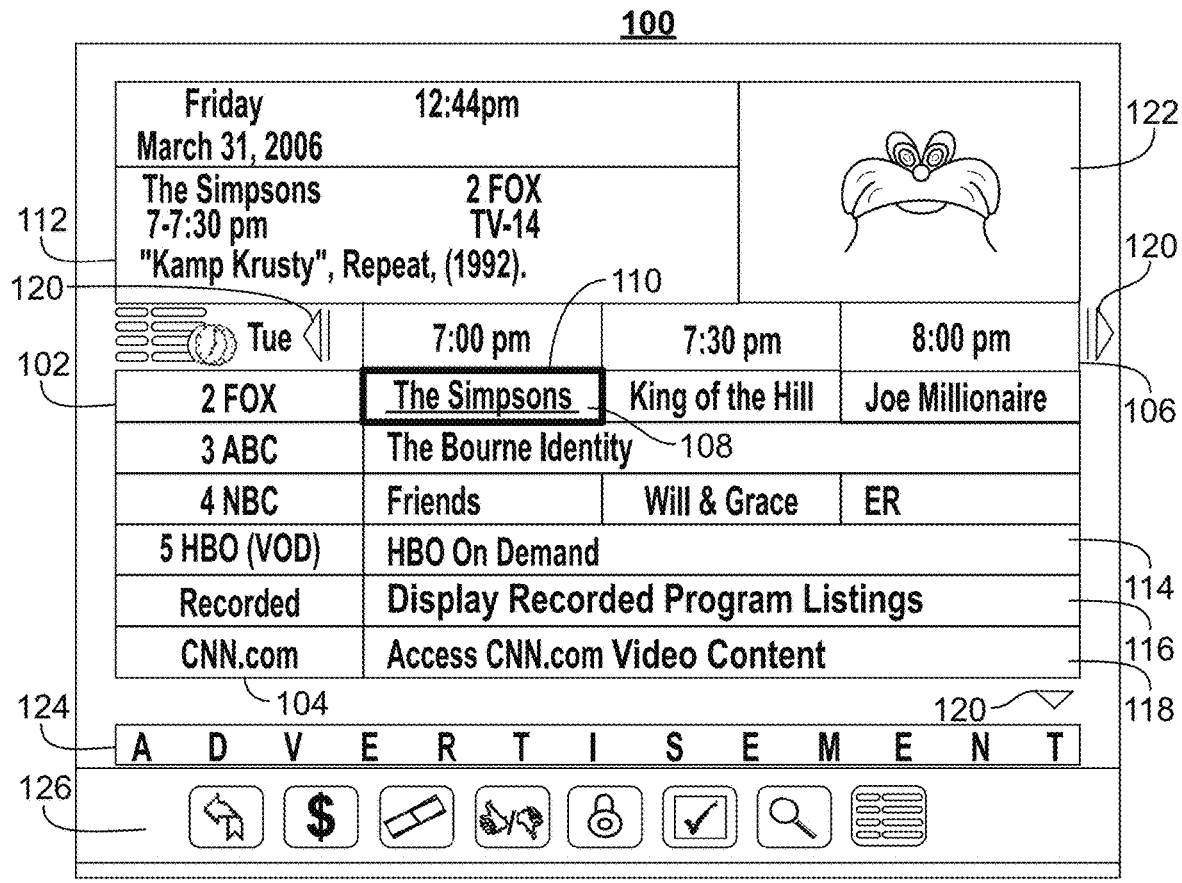
FIG. 1 shows an illustrative example of a display screen generated by a media guidance application in accordance with some embodiments of the disclosure.

Methods and systems are disclosed herein for an interactive media guidance application having a locked mode for viewing media assets. In the locked mode, the interactive media guidance application may provide media assets suited to a certain audience. The interactive media guidance application may determine suitable media assets for the locked mode based on media assets viewed by other users having characteristics similar to the user of the interactive media guidance application. In the locked mode, the interactive media guidance application may allow access to only certain media assets and/or limit the time period for which the media assets are presented.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

The media guidance application may access information in a user profile associated with a user to determine characteristics of the user. For example, the characteristics of the user may include age, gender, favorite programs, and other suitable characteristics. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above; for example, text, audio, images, video, or interactivity content forms. Content may be recorded, played, displayed or accessed by user equipment devices, but can also be part of a live performance.

As referred to herein, a "user profile" refers to a collection of information about a particular user. The information may include any information needed to determine media assets of interest to the user. For example, the information contained in the user profile may include demographic, geographic, or other information about the user or a group to which the user belongs. In another example, the information may be related to media content consumed by a user such as a viewing history, purchase history, recommendations, "liked" content, etc. In yet another example, the information in the user profile may include responses from the user to queries about the user's interests. This information may then be processed by the media guidance application to determine characteristics for the particular user.

As referred to herein, a "characteristic" may be any criterion or criteria that is indicative of media assets suitable for the user to view. For example, the characteristics of the user may include age, gender, favorite programs, and other suitable characteristics. For example, the favorite programs may include information relating to a genre, source, subject matter, and/or any other media guidance data related to the media assets in the favorite programs. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information; parental control ratings, critic's ratings, etc.; genre or category information, actor information; logo data for broadcasters' or providers' logos, etc.; media format (e.g., standard definition, high definition, 3D, etc.); advertisement information (e.g., text, images, media clips, etc.)), on-demand information, blogs, websites, and any other type of guidance data that is helpful for a user to navigate among and locate desired content selections.

The media guidance application may continuously, or according to a predetermined schedule, update the characteristics stored for the user in the user profile. As the user consume media assets, the media guidance application may continually determine what program types have been consumed. For example, the media guidance application may include a counter or other tracking mechanism that is updated as a user views media content. The counter may track the number of media assets of a particular type, the total length of all media assets of a particular type, etc. For example, the counter may track the number of media assets of a particular type that a user has consumed and/or the length of time a user has spent consuming media assets of a particular type.

The media guidance application may additionally or alternatively receive information for remote locations that includes information regarding other users with similar characteristics. For example, the media guidance application may compare the age of a user to metadata about a particular media asset. For example, every time the user views a particular media asset, the media guidance application may adjust the characteristics associated with the user profile for the user.

The media guidance application may also track and/or limit the amount of time spent consuming one or more types of media content. For example, the media guidance application may provide statistics about media content and duration of media content being watched on a weekly or monthly basis. For example, while the parent is present to monitor the child's viewing, the interactive media guidance application can collect information regarding media assets that are suitable for the child to view. For example, suitable media assets may include "Tom and Jerry," "News," and "America's Funniest Home Videos." The statistics may also include information on duration of time spent on viewing the media assets. For example, in a given week the child may have viewed "Tom and Jerry," "News," and "America's Funniest Home Videos" for 10 hours, 4 hours, and 9 hours, respectively. Information collected from multiple user equipment devices can be retrieved when another parent wishes to crowd-source information regarding media assets suitable to present to their child for viewing in the interactive media guidance application's locked mode.

In some embodiments, the media guidance application may be implemented on a user device. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens.

In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a website), or as stand-alone applications or clients on user equipment devices.

The media guidance application may also access storage circuitry to retrieve the user's characteristics. For example, the media guidance application may retrieve a user profile from memory, in which the user profile indicates characteristics for a user. For example, the characteristics of the user may include age, gender, favorite programs, and other suitable characteristics. The media guidance application may connect to a remote server to retrieve information regarding suitable media assets for the child. The interactive media guidance application may request media assets viewed by other users having characteristics similar to the child's characteristics.

For example, the media guidance application may determine that a user has accessed and/or selected a media listing as shown in FIG. 1. FIG. 1 shows an illustrative display screen that may be used to provide media guidance data. The display screen shown in FIG. 1 may be implemented on any suitable user equipment device or platform. While the display of FIG. 1 is illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to, one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or a channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

As referred to herein, a "threshold" refers to a data point used by the media guidance application to trigger an action. For example, the threshold may constitute a particular value (e.g., an amount, a length of time, etc.). For example, the interactive media guidance application may receive characteristics of the child from a user profile for the child and compare the characteristics to the received characteristics for the other children. The characteristics of the user may include age, gender, favorite programs, and other suitable characteristics. The other children may be of similar age, e.g., boys of age 7-9. The child may be a boy that is 8 years old. The threshold may be set to one overlapping characteristic. As such, the interactive media guidance application may compare and determine that the 8-year old child is of similar age and gender to the other children and that there are two overlapping characteristics exceeding the threshold.

Figure 2:
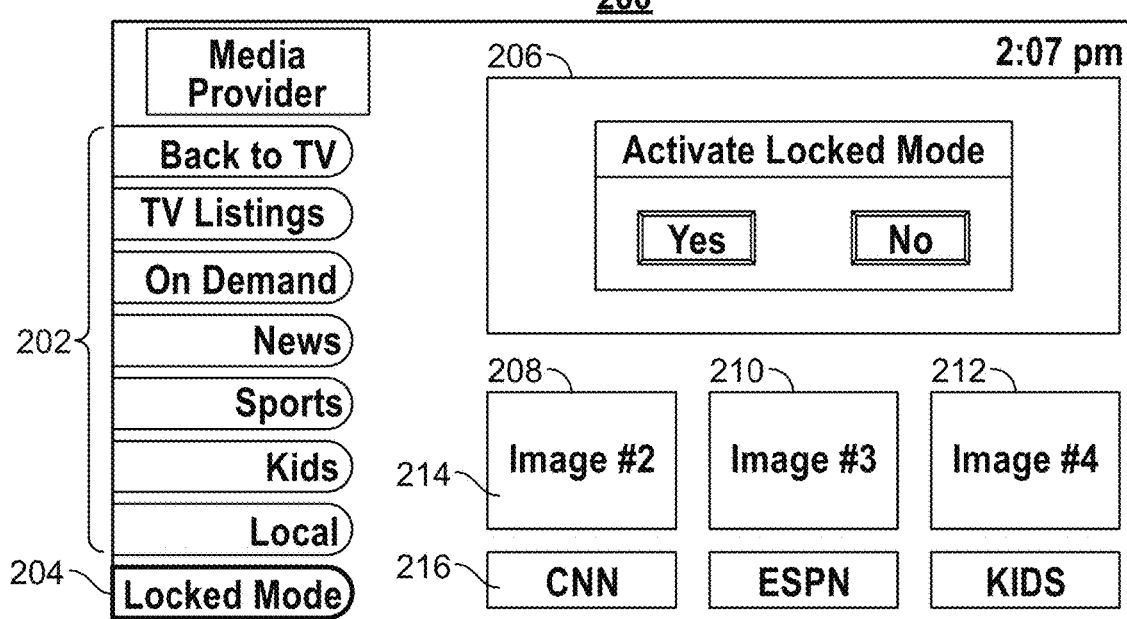
FIG. 2 shows another illustrative example of a display screen generated by a media guidance application including a locked mode for viewing media assets in accordance with some embodiments of the disclosure.

Another display arrangement for providing media guidance is shown in FIG. 2. Video mosaic display 200 includes selectable options 202 for content information organized based on content type, genre, and/or other organization criteria. In display 200, option 204 is selected, thus providing an option to activate a locked mode for viewing media assets. In display 200 the content may include graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on). In some embodiments, the media guidance application may allow a second user (e.g., a parent) to access display 200 to obtain viewing statistics and/or edit parental controls related to a first user (e.g., a child).

The media guidance application provides window 206, which includes an option menu to activate a locked mode for viewing media assets. For example, window 206 includes an option menu for choosing to activate a locked mode for viewing media assets. The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

In some embodiments, the media guidance application may present a dashboard that includes statistics with time, channel number, genre, educational value, entertainment value, professional value, etc. and others of the programs being watched. The media guidance application may also allow users to manage the viewing habits, set goals, set restrictions, set triggers to improve the quality of the programs that other users (e.g., children) view. In addition, the media guidance application may alert a user (e.g., a parent) if, for a period of time, the set goals are not being met or under risk of not being met. The media guidance application may also send appropriate digests (e.g., via SMS, email, social networking and/or messaging tools, etc.) to routinely keep the user (e.g., a parent) up to date on the progress on certain goals.

Figure 3:
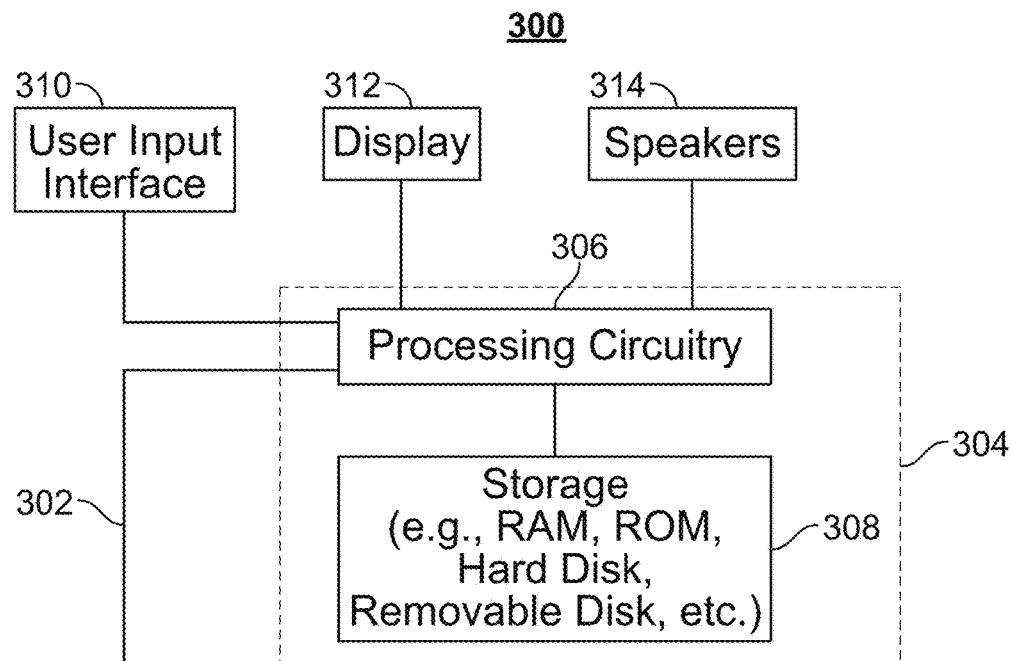
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and, specifically, processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. Storage 308 may be used to store various types of content described herein, as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature polysilicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
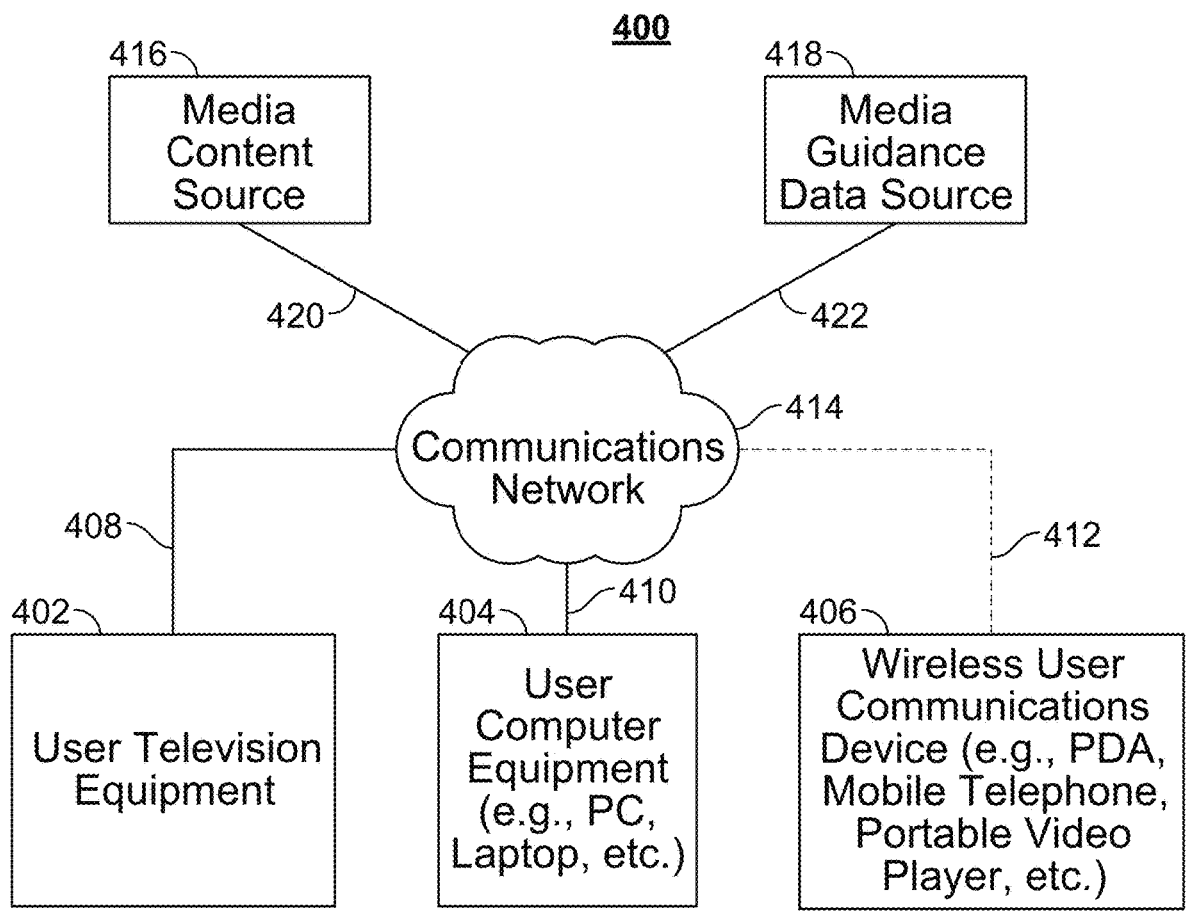
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website, www.allrovi.com, on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify which sources or services a given user subscribes to and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates the likelihood that a given user will terminate access to a service/source. For example, the media guidance application may process the viewer data with the subscription data using the model to generate a value or score that indicates the likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or as a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services.

In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
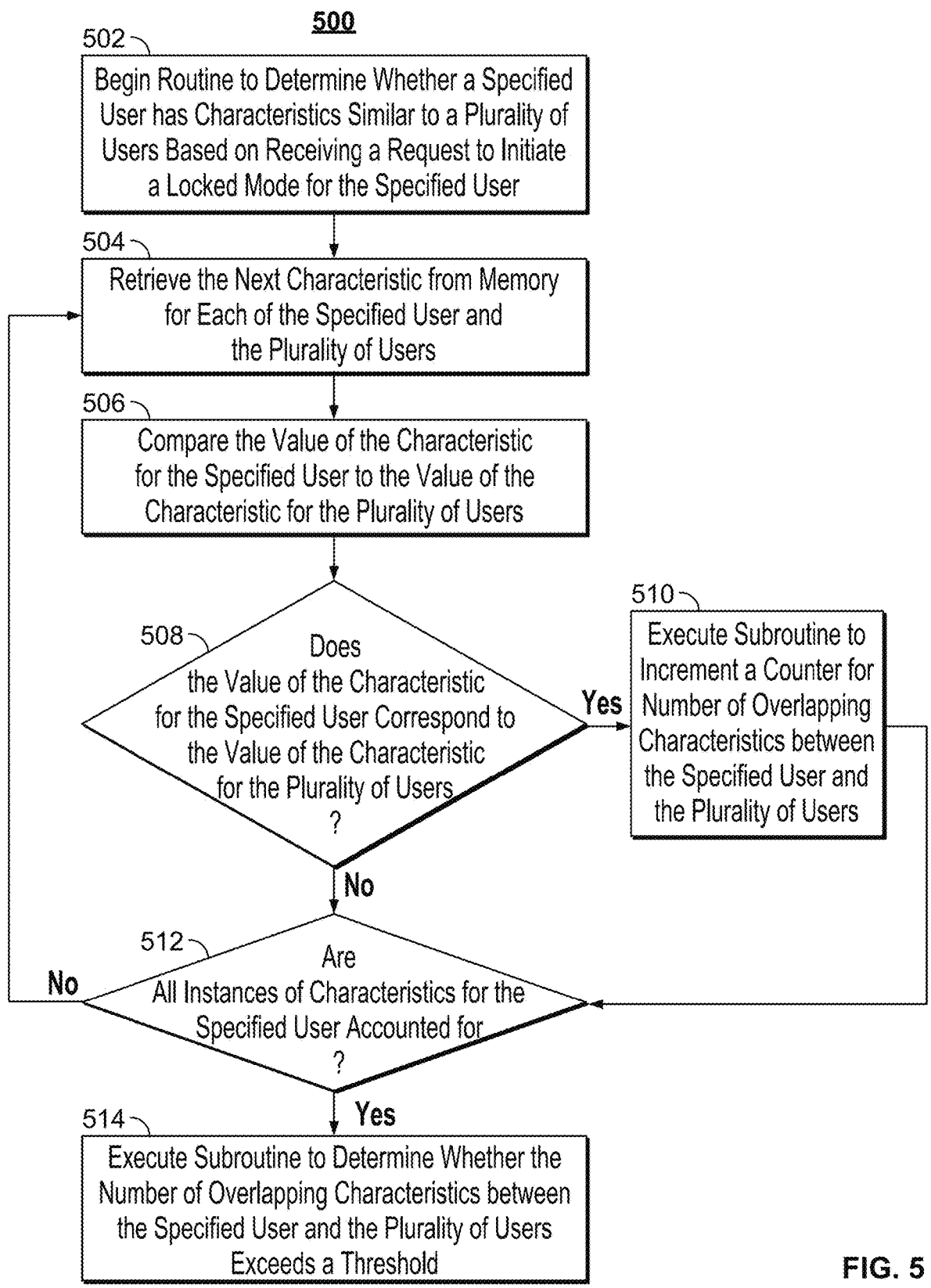
FIG. 5 is a flowchart of illustrative steps for determining whether a specified user has characteristics similar to characteristics for a plurality of users in accordance with some embodiments of the disclosure.

FIGS. 5 and 6 present an algorithm for the media guidance application (e.g., via control circuitry 304 (FIG. 3)) to determine whether a specified user has characteristics similar to characteristics for a plurality of users in accordance with some embodiments of the disclosure. In some embodiments this algorithm may be encoded on to non-transitory storage medium (e.g., storage device 308 (FIG. 3)) as a set of instructions to be decoded and executed by processing circuitry (e.g., processing circuitry 306 (FIG. 3)). Processing circuitry may in turn provide instructions to other sub-circuits contained within control circuitry 304 (FIG. 3), such as the tuning, video generating, encoding, decoding, encrypting, decrypting, scaling, analog/digital conversion circuitry, and the like.

The flowchart in FIG. 5 describes an algorithm 500 for the media guidance application (e.g., via control circuitry 304 (FIG. 3)) to determine whether a specified user has characteristics similar to characteristics for a plurality of users in accordance with some embodiments of the disclosure.

At step 502, the media guidance application begins an algorithm to determine whether a specified user has characteristics similar to a plurality of users based on a request to initiate a locked mode for the specified user, this may be done either directly or indirectly in response to a user action or input (e.g., from signals received by control circuitry 304 (FIG. 3) or user input interface 310 (FIG. 3)). For example, the algorithm may begin directly in response to control circuitry 304 (FIG. 3) receiving signals from user input interface 310 (FIG. 3), or control circuitry 304 (FIG. 3) may prompt the user to confirm their input using a display (e.g., by generating a prompt to be displayed on display 312 (FIG. 3)) prior to running the algorithm.

At step 504, the media guidance application (e.g., via control circuitry 304 (FIG. 3)) proceeds to retrieve the next characteristic from memory for each of the specified user and the plurality of users. In some embodiments control circuitry 304 may receive a single primitive data structure that represents the value of the next characteristic. In some embodiments the value may be stored as part of a larger data structure, and control circuitry 304 (FIG. 3) may retrieve the value by executing appropriate accessor methods to retrieve the value from the larger data structure.

At step 506, the media guidance application (e.g., via control circuitry 304 (FIG. 3)) proceeds to compare the value of the characteristic for the specified user to the value of the characteristic for the plurality of users. In some embodiments, either or both characteristics for comparison may be stored (e.g., on storage device 308 (FIG. 3)) prior to beginning the algorithm. In some embodiments, the value of data may also be retrieved for each and every characteristic. In some embodiments, control circuitry 304 (FIG. 3) may directly compare the value of the characteristic for the specified user with the value of the characteristic for the plurality of users by accessing the values respectively from memory and performing a value comparison. In some instances, control circuitry 304 (FIG. 3) may call a comparison function (e.g., for object-to-object comparison) to compare the value of the characteristic for the specified user with the value of the characteristic for the plurality of users.

At step 508, the media guidance application (e.g., via control circuitry 304 (FIG. 3)) compares the value of the characteristic for the specified user and the value of the characteristic for the plurality of users to determine if the value of the characteristic for the specified user corresponds to the value of the characteristic for the plurality of users. If the condition is satisfied, the media guidance application proceeds to step 510; if the condition is not satisfied, the media guidance application proceeds to step 512 instead.

At step 510, the media guidance application (e.g., via control circuitry 304 (FIG. 3)) will execute a subroutine to increase the counter amount corresponding to a number of overlapping characteristics between the specified user and the plurality of users based on the condition at step 508 being satisfied. For example, the media guidance application may increase the number of the counter by one (e.g., indicating that the user has consumed a media asset of the particular type). After the subroutine is executed, the media guidance application proceeds to step 512.

At step 512, the media guidance application (e.g., via control circuitry 304 (FIG. 3)) determines whether or not all instances of characteristics for the specified user are accounted for. If the condition is satisfied, the algorithm may proceed to step 514; if the condition is not satisfied, the media guidance application proceeds to step 504 instead and retrieves the next characteristic from memory for each of the specified user and the plurality of users.

At step 514, the media guidance application (e.g., via control circuitry 304 (FIG. 3)) will execute a subroutine to determine whether the number of overlapping characteristics between the specified user and the plurality of users exceeds a threshold based on the condition of step 512 being satisfied.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations, such as those at 508 and 512, may be performed in any order or in parallel or simultaneously to reduce lag or increase the speed of the system or method. As a further example, in some embodiments several characteristics may be evaluated in parallel, using multiple logical processor threads, or the algorithm may be enhanced by incorporating branch prediction. Furthermore, it should be noted that the algorithm of FIG. 5 may be implemented on a combination of appropriately configured software and hardware, and that any of the devices or equipment discussed in relation to FIGS. 3-4 could be used to implement one or more portions of the algorithm.

The pseudocode in FIG. 6 describes an algorithm 600 to determine whether a specified user has characteristics similar to characteristics for a plurality of users in accordance with some embodiments of the disclosure. It will be evident to one skilled in the art that the algorithm described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, media guidance application (e.g., via control circuitry 304 (FIG. 3)) runs a subroutine to initialize variables and prepare to determine whether a specified user has characteristics similar to characteristics for plurality of users, which begins on line 605. For example, in some embodiments, the media guidance application (e.g., via control circuitry 304 (FIG. 3)) may copy instructions from non-transitory storage medium (e.g., storage device 308 (FIG. 3)) into RAM or into the cache for processing circuitry 306 (FIG. 3) during the initialization stage. Additionally, in some embodiments the value of the characteristic for the specified user being used for comparison, or a tolerance level for determining if two values are essentially equivalent, may be retrieved, set, and stored at 601.

At line 605, media guidance application (e.g., via control circuitry 304 (FIG. 3)) receives characteristics for each of the specified user and the plurality of users. In some embodiments these characteristics may be retrieved from memory (e.g., storage device 308 (FIG. 3)) or a user input (e.g., received via user input interface 310 (FIG. 3)). Control circuitry 304 may receive a value for a characteristic by receiving, for example, a pointer to an array of values of the characteristics. In another example, control circuitry 304 may receive an object of a class, such as an iterator object containing elements of the criteria.

At line 606, media guidance application (e.g., via control circuitry 304 (FIG. 3)) iterates through the various characteristics for the specified user, if only a single instance is available, the loop will only execute once. This loop may be implemented in multiple fashions depending on the choice of hardware and software language used to implement the algorithm of FIG. 6; for example, this may be implemented as part of a "for" or "while" loop.

At line 607, media guidance application (e.g., via control circuitry 304 (FIG. 3)) stores the value of a characteristic for the specified user into a temporary variable "A." In some embodiments the value of the characteristic for the specified user will be stored as part of a larger data structure or class, and the value of the characteristic for the specified user may be obtained through appropriate accessor methods. In some embodiments, the value of the characteristic for the specified user may be converted from a string or other non-numeric data type into a numeric data type by means of an appropriate hashing algorithm. In some embodiments, the characteristic may be encoded as a primitive data structure, and rather than using a temporary variable, the characteristic may be directly used in the comparisons at lines 609 and 611.

At line 608, media guidance application (e.g., via control circuitry 304 (FIG. 3)) stores the value of the characteristic for the plurality of users into a temporary variable "B." Similar to the characteristic for the specified user, in some embodiments the value of the characteristic for the plurality of users related to variable will be stored as part of a larger data structure or class, and the value of the characteristic for the plurality of users may be obtained through accessor methods. In some embodiments, the value of the characteristic for the plurality of users may be converted from a string or other non-numeric data type into a numeric data type by means of an appropriate hashing algorithm, or the data related to the media asset may be a primitive data structure, and may be directly used in the comparisons at lines 609 and 611.

At line 609, media guidance application (e.g., via control circuitry 304 (FIG. 3)) compares the value of A to the value of B to see if they are essentially equivalent. For example, where A and B represent age of the respective users, this is achieved by subtracting the value of B from A, taking the absolute value of the difference, and then comparing the absolute value of the difference to a predetermined tolerance level. In some embodiments, the tolerance level may be a set percentage of either A or B. In some embodiments, the tolerance level may be a fixed number. For example, setting the tolerance level to a set multiple of machine epsilon may allow for the algorithm to account for small rounding errors that may result from the use of floating point arithmetic. In some embodiments, the tolerance level may be set to zero, or the condition inside the IF statement may be replaced with a strict equivalence between A and B.

At line 610, media guidance application (e.g., via control circuitry 304 (FIG. 3)) executes a subroutine to increase the counter amount corresponding to number of overlapping characteristics between the specified user and the plurality of users if the condition in line 609 is satisfied. In some embodiments, this may be achieved by processing circuitry 306 (FIG. 3) sending the appropriate signals to control circuitry 304 (FIG. 3).

At line 611, the media guidance application (e.g., via control circuitry 304 (FIG. 3)) executes a subroutine to determine whether the number of overlapping characteristics between the specified user and the plurality of users exceeds a threshold. In some embodiments, this may be achieved by processing circuitry 306 (FIG. 3) sending the appropriate signals to control circuitry 304 (FIG. 3).

At line 613, media guidance application (e.g., via control circuitry 304 (FIG. 3)) runs a termination subroutine after the algorithm has performed its function. For example, in some embodiments, control circuitry 304 (FIG. 3) may destruct variables, perform garbage collection, free memory or clear the cache of processing circuitry 306 (FIG. 3).

It will be evident to one skilled in the art that the algorithm described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs.

Figure 7:
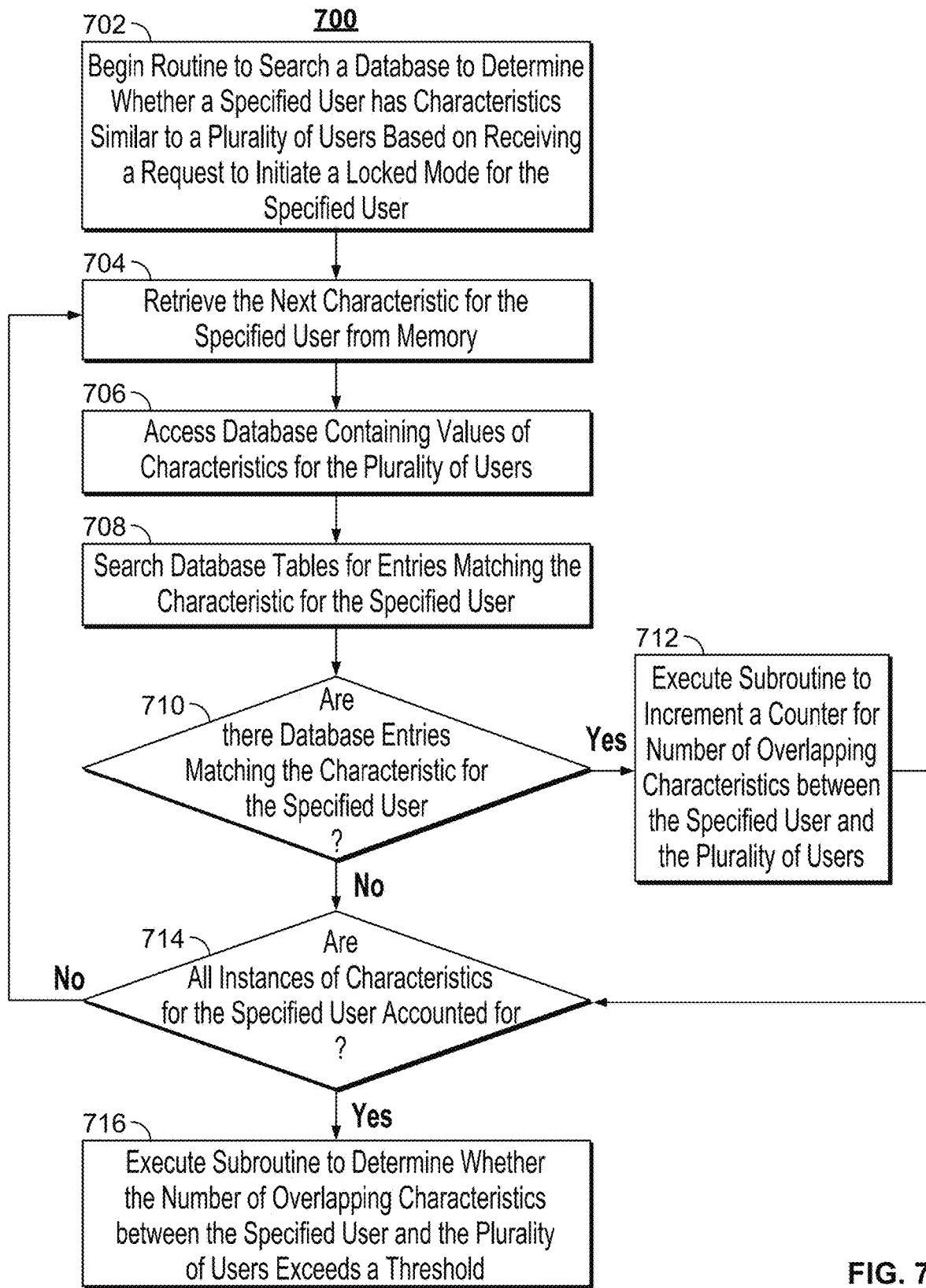
FIG. 7 is a flowchart of an illustrative process for using a database to determine whether a specified user has characteristics similar to characteristics for a plurality of users in accordance with some embodiments of the disclosure.

FIGS. 7 and 8 present an algorithm for media guidance application (e.g., via control circuitry 304) to determine whether a specified user has characteristics similar to characteristics for a plurality of users in accordance with some embodiments of the disclosure. Similar to the algorithms described by FIGS. 5 and 6, in some embodiments, this algorithm may be encoded on to non-transitory storage medium (e.g., storage device 308 (FIG. 3)) as a set of instructions to be decoded and executed by processing circuitry (e.g., processing circuitry 306 (FIG. 3)). Processing circuitry may in turn provide instructions to other sub-circuits contained within control circuitry 304 (FIG. 3), such as the tuning, video generating, encoding, decoding, encrypting, decrypting, scaling, analog/digital conversion circuitry, and the like.

The flowchart in FIG. 7 describes an algorithm 700 for a media guidance application (e.g., via control circuitry 304 (FIG. 3)) to use a database to determine whether a specified user has characteristics similar to characteristics for a plurality of users in accordance with some embodiments of the disclosure.

At step 702, the media guidance application (e.g., via control circuitry 304 (FIG. 3)) begins a routine to search a database to determine whether a specified user has characteristics similar to a plurality of users based on a request to initiate a locked mode for the specified user. In some embodiments, this may be done either directly or indirectly in response to a user action or input (e.g., from signals received by control circuitry 304 (FIG. 3) or user input interface 310 (FIG. 3)).

At step 704, the media guidance application (e.g., via control circuitry 304 (FIG. 3)) retrieves the next characteristic for the specified user from memory (e.g., storage 308 (FIG. 3) and/or any location accessible via communications network 414 (FIG. 4)). In some embodiments, the media guidance application (e.g., via control circuitry 304 (FIG. 3)) may retrieve a single primitive data structure that represents the value of the next characteristic for the specified user. In some embodiments, the media guidance application (e.g., via control circuitry 304 (FIG. 3)) may retrieve the value from a larger class or data structure.

At step 706, the media guidance application (e.g., via control circuitry 304 (FIG. 3)) accesses a database containing values of characteristics for the plurality of users. For example, the media guidance application may access a database that lists various characteristics for the plurality of users. In some embodiments, the media guidance application (e.g., via control circuitry 304 (FIG. 3)) may store this database locally (e.g., on storage device 308 (FIG. 3)) prior to beginning the algorithm. In some embodiments, the media guidance application (e.g., via control circuitry 304 (FIG. 3)) may also access the database by using communications circuitry to transmit information across a communications network (e.g., communications network 414 (FIG. 4)) to a database implemented on a remote storage device (e.g., media guidance data source 418 (FIG. 4)).

At step 708, the media guidance application (e.g., via control circuitry 304 (FIG. 3)) searches database tables for entries matching the characteristic for the specified user. In some embodiments, this may be done by comparing an identifier, for example a string or integer representing the characteristic for the specified user, that matches the types of identifiers used inside the database. In some embodiments, the media guidance application (e.g., via control circuitry 304 (FIG. 3)) may submit a general query to the database for table entries matching the characteristic for the specified user, and the media guidance application (e.g., via control circuitry 304 (FIG. 3)) may receive a list of indices or a data structure containing a portion of the database contents. In some embodiments, the database may implement a junction table that in turn cross-references entries from other databases. In this case, the media guidance application (e.g., via control circuitry 304 (FIG. 3)) may retrieve indices from a first database that, in turn, can be used to retrieve information from a second database. Although, the media guidance application (e.g., via control circuitry 304 (FIG. 3)) is described as interacting with a single database for purposes of clarity, it is understood that the algorithm of FIG. 7 may be implemented using multiple independent or cross-referenced databases.

At step 710, the media guidance application (e.g., via control circuitry 304 (FIG. 3)) determines if there is a database entry that matches the characteristic for the specified user. In some embodiments, the media guidance application (e.g., via control circuitry 304 (FIG. 3)) may receive a signal from the database indicating that there are no matching entries. In some embodiments, control circuitry 304 may instead receive a list of indices or data structures with a NULL or dummy value. If the media guidance application (e.g., via control circuitry 304 (FIG. 3)) identifies that there are database entries matching the characteristic, the media guidance application (e.g., via control circuitry 304 (FIG. 3)) proceeds to step 712, otherwise the media guidance application (e.g., via control circuitry 304 (FIG. 3)) proceeds to step 714.

At step 712, media guidance application (e.g., via control circuitry 304 (FIG. 3)) will execute a subroutine to increase the counter amount corresponding to a number of overlapping characteristics between the specified user and the plurality of users. Afterwards, the media guidance application (e.g., via control circuitry 304 (FIG. 3)) may proceed to step 714 where it is determined if there are additional characteristics for the specified user remaining for comparison against the database entries. For example, the media guidance application (e.g., via control circuitry 304 (FIG. 3)) may compare the next characteristic for the specified user to multiple database entries to determine whether or not any of the entries match. At step 716, the media guidance application (e.g., via control circuitry 304 (FIG. 3)) will execute a subroutine to determine whether the number of overlapping characteristics between the specified user and the plurality of users exceeds a threshold.

It is contemplated that the descriptions of FIG. 7 may be used with any other embodiment of this disclosure. In addition, the descriptions described in relation to the algorithm of FIG. 7 may be done in alternative orders or in parallel to further the purposes of this disclosure. For example, the media guidance application (e.g., via control circuitry 304 (FIG. 3)) may submit multiple queries to the database in parallel, or it may submit multiple queries to a plurality of similar databases in order to reduce lag and speed the execution of the algorithm. As a further example, although steps may be described as being mutually exclusive, both steps may be processed for a single instance of the characteristic. To further this purpose, in some embodiments, steps may be performed in parallel by control circuitry 304. Furthermore, it should be noted that the algorithm of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes an algorithm 800 for using a database to determine whether a specified user has characteristics similar to characteristics for a plurality of users in accordance with some embodiments of the disclosure. It will be evident to one skilled in the art that the algorithm described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the media guidance application (e.g., via control circuitry 304 (FIG. 3)) runs a subroutine to initialize variables and prepare to retrieve instances of characteristics for the specified user, which begins on line 805. For example, in some embodiments, the media guidance application (e.g., via control circuitry 304 (FIG. 3)) may copy instructions from non-transitory storage medium (e.g., storage device 308 (FIG. 3)) into RAM or into the cache for processing circuitry 306 (FIG. 3) during the initialization stage.

At line 805, the media guidance application (e.g., via control circuitry 304 (FIG. 3)) receives instances of characteristics for the specified user. In some embodiments, this criteria may be retrieved from memory (e.g., storage 308 (FIG. 3) and/or any location accessible via communications network 414 (FIG. 4)) or be based on a user input (e.g., received via user input interface 310 (FIG. 3)).

At line 806, the media guidance application (e.g., via control circuitry 304 (FIG. 3)) iterates through the various instances of the characteristics for the specified user; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments, it may be convenient to store the instances of criteria in a single class or encapsulated data structure that will perform the loop as part of an internal method.

At line 807, the media guidance application (e.g., via control circuitry 304 (FIG. 3)) queries a database containing values of characteristics for a plurality of users for entries matching a characteristic for the specified user. Depending on how the database is implemented and how the characteristic is stored, an intermittent step may be required to convert the characteristic into a form consistent with the database. For example, the media guidance application (e.g., via control circuitry 304 (FIG. 3)) may encode the characteristic into a string or an integer using an appropriate hashing algorithm prior to being transmitted to the database by the media guidance application (e.g., via control circuitry 304 (FIG. 3)) as part of a query. In some embodiments, the characteristic may be encoded as a primitive data structure, and the media guidance application (e.g., via control circuitry 304 (FIG. 3)) may submit the characteristic as a query to the database directly. After querying the database, the media guidance application (e.g., via control circuitry 304 (FIG. 3)) may receive a set of database entries matching the value of the characteristic for the specified user. In some embodiments, the media guidance application (e.g., via control circuitry 304 (FIG. 3)) may receive these entries in the form of a data-structure, a set of indices of the database, or a set of indices of another cross-referenced database.

At line 808, control circuitry 304 determines if there are any database entries matching the characteristic for the specified user. In some embodiments, the media guidance application (e.g., via control circuitry 304 (FIG. 3)) may determine this by checking if the database returned an empty data structure or a NULL value in response to the query in line 807. If there are matching database entries the algorithm may proceed to line 809. If there were no matching database entries, the media guidance application (e.g., via control circuitry 304 (FIG. 3)) may instead proceed to line 806.

At line 809, control circuitry 304 retrieves the value of the characteristic for the plurality of users from the database entries matching the characteristic for the specified user. For example, if the media guidance application (e.g., via control circuitry 304 (FIG. 3)) retrieves a list of indices after querying the database in line 807, in some embodiments, the media guidance application (e.g., via control circuitry 304 (FIG. 3)) may retrieve the database entries for the characteristics located at the received indices. In some embodiments, the indices may point to a larger data structure contained within the database, and the media guidance application (e.g., via control circuitry 304 (FIG. 3)) may retrieve the values of characteristics from within the data structure using appropriate accessor methods. In some embodiments, the media guidance application (e.g., via control circuitry 304 (FIG. 3)) may retrieve the values of the characteristics and store them in a separate data structure locally (e.g., in storage 308) prior to proceeding further. After retrieving the values of the media asset, the media guidance application (e.g., via control circuitry 304 (FIG. 3)) will proceed to line 810.

At line 810, the media guidance application (e.g., via control circuitry 304 (FIG. 3)) executes a subroutine to use the values of the media asset and increase a counter amount corresponding to a number of overlapping characteristics between the specified user and the plurality of users using processing circuitry 306 (FIG. 3). Afterwards, the media guidance application (e.g., via control circuitry 304 (FIG. 3)) may proceed to line 811.

At line 811, the media guidance application (e.g., via control circuitry 304 (FIG. 3)) executes a subroutine to determine whether the number of overlapping characteristics between the specified user and the plurality of users exceeds a threshold. In some embodiments, this may be achieved by processing circuitry 306 (FIG. 3) sending the appropriate signals to control circuitry 304 (FIG. 3).

At line 813, the media guidance application (e.g., via control circuitry 304 (FIG. 3)) executes a termination subroutine after the media guidance application (e.g., via control circuitry 304 (FIG. 3)) has performed its function and all instances of the characteristics for the specified user have been processed and checked against the database. For example, in some embodiments, the media guidance application (e.g., via control circuitry 304 (FIG. 3)) may destruct variables, perform garbage collection, free memory or clear the cache of processing circuitry 306 (FIG. 3).

It will be evident to one skilled in the art that the algorithm described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments, the code may be re-written so the media guidance application (e.g., via control circuitry 304 (FIG. 3)) is instructed to evaluate multiple instances of criteria and submit multiple database queries simultaneously using a plurality of processors or processor threads. It is also understood that although the media guidance application is described as interacting with a single database, this is only a single embodiment described for illustrative purposes, and the media guidance application (e.g., via control circuitry 304 (FIG. 3)) may interact with multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow the media guidance application (e.g., via control circuitry 304 (FIG. 3)) to utilize a look-up table or database front-end efficiently stored on a small local drive to access a larger database stored on a remote server on demand.

FIG. 9 is a flowchart of an illustrative process 900 for implementing a locked mode for viewing media assets in accordance with some embodiments of the disclosure. It should be noted that process 900 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4). In addition, one or more steps of process 900 may be incorporated into or combined with one or more steps of any other process or embodiment (e.g., FIGS. 5-8, 10, and 14).

At step 902, the media guidance application receives (e.g., via control circuitry 304 (FIG. 3)) a request to initiate a locked mode for a specified time period on a user equipment device (e.g., user equipment 402, 404, and/or 406 (FIG. 4)). The request indicates that a specified user of the user equipment device is only allowed access to media assets selected for the locked mode during the specified time period. For example, a parent may need to leave their child unsupervised while they leave their home to run errands. The parent may initiate the locked mode for their child to view media assets for two hours before the child has to start working on their homework. By providing the parent with the locked mode option, the interactive media guidance application allows the parent to have peace of mind that their child is viewing media content suitable for their age and that the child will not spend an excessive amount of time viewing the media assets.

At step 904, the interactive media guidance application receives (e.g., via control circuitry 304 (FIG. 3)) information relating to media assets viewed by a plurality of users having similar characteristics to each other. For example, the interactive media guidance application may receive information from a remote server (e.g., media content source 416 or media guidance data source 418 (FIG. 4)) relating to media assets viewed by other children of similar age to each other.

At step 906, the interactive media guidance application determines (e.g., via control circuitry 304 (FIG. 3)) a media asset of interest to the plurality of users based on the received information. For example, the interactive media guidance application may determine that "ABC" program "America's Funniest Home Videos" is a media asset of interest to the other children having similar characteristics to each other as the child based on the received information.

At step 908, the interactive media guidance application determines (e.g., via control circuitry 304 (FIG. 3)) whether the specified user has characteristics similar to the plurality of users. For example, the interactive media guidance application may retrieve characteristics of the child from a user profile for the child and compare the characteristics to the characteristics of the other children. The characteristics of the user may include age, gender, favorite programs, and other suitable characteristics. The other children may be of similar age, e.g., years 7-9. The child may be 8 years old. As such, the interactive media guidance application may compare and determine that the 8-year old child is of similar age to the other children. If the interactive media guidance application determines that the specified user does not have characteristics similar to the plurality of users, the interactive media guidance application returns to step 904 and receives (e.g., via control circuitry 304 (FIG. 3)) information relating to media assets viewed by another plurality of users having similar characteristics to each other.

At step 910, the interactive media guidance application transmits (e.g., via control circuitry 304 (FIG. 3)) the media asset of interest to the specified user in response to determining that the specified user has characteristics similar to the plurality of users. For example, once the interactive media guidance application determines the child's characteristics are similar to other children, the interactive media guidance application may transmit the media asset of interest to the child, e.g., for display on a television display device.

At step 912, the interactive media guidance application determines (e.g., via control circuitry 304 (FIG. 3)) whether the time period specified in the request to initiate the locked mode is over. If the specified time period is over, the interactive media guidance application proceeds to end the process. For example, the interactive media guidance application may turn off the user equipment device after the specified period of time is over. The parent may have instructed the child to complete their homework after finishing the media content being presented. The parent may enforce that by having the interactive media guidance application turn off the user equipment device so the child cannot continue watching media content against the parent's wishes.

If the specified time period is not over, the interactive media guidance application proceeds to step 906. At step 906, the interactive media guidance application determines (e.g., via control circuitry 304 (FIG. 3)) another media asset of interest to the plurality of users based on the received information. In some embodiments, the interactive media guidance application determines (e.g., via control circuitry 304 (FIG. 3)) that the media asset of interest has a play length less than the specified time period. The interactive media guidance application transmits another media asset of interest to the specified user as long as the play length of the media assets fits within the specified time period.

For example, the parent may have specified a time period of one hour for the locked mode to view media assets. After the first media asset is over and a half hour remains in the specified time period, the interactive media guidance application determines a second media asset of interest as long as the second media asset of interest has a play length less than or equal to the remaining time period. The interactive media guidance application transmits the second media asset of interest to the child for viewing in response to determining that the media asset fits in the remaining time period for the locked mode.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

Figure 10:
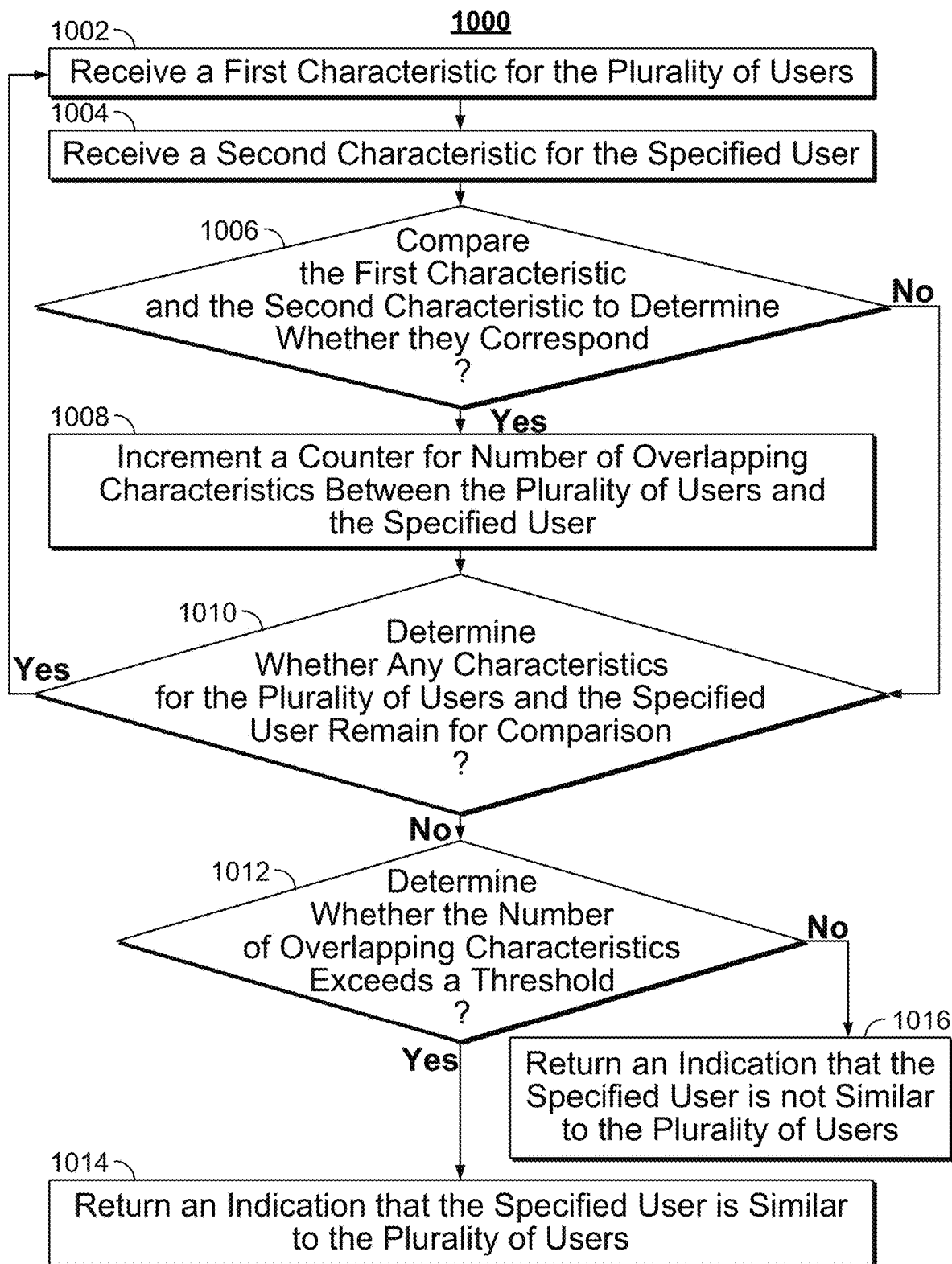
FIG. 10 is a flowchart of an illustrative process for step 908 of FIG. 9 in accordance with some embodiments of the disclosure.

FIG. 10 is a flowchart of an illustrative process 1000 for step 908 of FIG. 9 in accordance with some embodiments of the disclosure. FIGS. 5 and 7 also present alternative embodiments of processes for implementing at least some portions of the process of step 908. Each of the steps of FIGS. 5, 7, and 10 may be performed in any order or in parallel or substantially simultaneously to implement the process for step 908 of FIG. 9.

At step 1002, the media guidance application receives (e.g., via control circuitry 304 (FIG. 3)) a first characteristic for the plurality of users (e.g., from storage 308 (FIG. 3) and/or any location accessible via communications network 414 (FIG. 4)) for the first characteristic for the plurality of users. For example, the interactive media guidance application may connect (e.g., via control circuitry 304 (FIG. 3)) to a remote server (e.g., any location accessible via communications network 414 (FIG. 4)) to retrieve information regarding media assets viewed by children having similar characteristics to each other. The characteristics may include age, gender, favorite programs, and other suitable characteristics. The information may include the first characteristic for the plurality of users.

At step 1004, the media guidance application receives (e.g., via control circuitry 304 (FIG. 3)) a second characteristic for the specified user (e.g., from storage 308 (FIG. 3) and/or any location accessible via communications network 414 (FIG. 4)) for the second characteristic for the specified user. For example, the media guidance application may retrieve (e.g., via control circuitry 304 (FIG. 3)) a user profile for a child from memory (e.g., from storage 308 (FIG. 3)). The user profile may include characteristics of the child, such as age, gender, favorite programs, and other suitable characteristics. The interactive media guidance application may receive the second characteristic of the child from the user profile for the child.

At step 1006, interactive media guidance application compares (e.g., via control circuitry 304 (FIG. 3)) the first characteristic and the second characteristic to determine whether they correspond. For example, the characteristics of the specified user, e.g., the child, may include age, gender, favorite programs, and other suitable characteristics. The child may be a boy that is 8 years old. The plurality of users, e.g., other children, may be of similar age, e.g., boys of age 7-9. The interactive media guidance application may compare and determine that the 8-year old child is of similar age and gender to the other children. If the characteristics correspond, interactive media guidance application proceeds to step 1008. If the characteristics do not correspond, interactive media guidance application proceeds to step 1010.

At step 1008, the interactive media guidance application (e.g., via control circuitry 304 (FIG. 3)) increments a counter corresponding to the number of overlapping characteristics between the plurality of users and the specified user. For example, the interactive media guidance application may increment the counter by one when the first characteristic is determined to correspond to the second characteristic.

At step 1010, the interactive media guidance application determines (e.g., via control circuitry 304 (FIG. 3)) whether any characteristics for the plurality of users and the specified user remain for comparison. If a characteristic for the plurality of users and the specified user remains for comparison, the interactive media guidance application proceeds to step 1002. For example, in the first iteration of this loop, the interactive media guidance application may compare and determine that the 8-year old child is of similar age characteristic to the other children, e.g., boys of age 7-9. Since the gender characteristic remains for comparison, interactive media guidance application may determine that a second iteration of the loop is required and proceed to step 1002. If no characteristics for the plurality of users and the specified user remain for comparison, the interactive media guidance application proceeds to step 1012.

At step 1012, the interactive media guidance application determines (e.g., via control circuitry 304 (FIG. 3)) whether the number of overlapping characteristics exceeds a threshold. The threshold may be retrieved from memory (e.g., from storage 308 (FIG. 3)). For example, the threshold may be set to one overlapping characteristic. The plurality of users, e.g., other children, may be of similar age, e.g., boys of age 7-9. The interactive media guidance application may compare and determine that the specified user, e.g., an 8-year old child, is of similar age and gender to the other children. As such, the interactive media guidance application may determine that there are two overlapping characteristics and that the number of overlapping characteristics exceeds the threshold. If the number of overlapping characteristics exceeds the threshold, the interactive media guidance application proceeds to step 1014. At step 1014, the interactive media guidance application returns an indication that the specified user is similar to the plurality of users. If the number of overlapping characteristics does not exceed the threshold, the interactive media guidance application proceeds to step 1016. At step 1016, the interactive media guidance application returns an indication that the specified user is not similar to the plurality of users.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 10.

Figure 11:
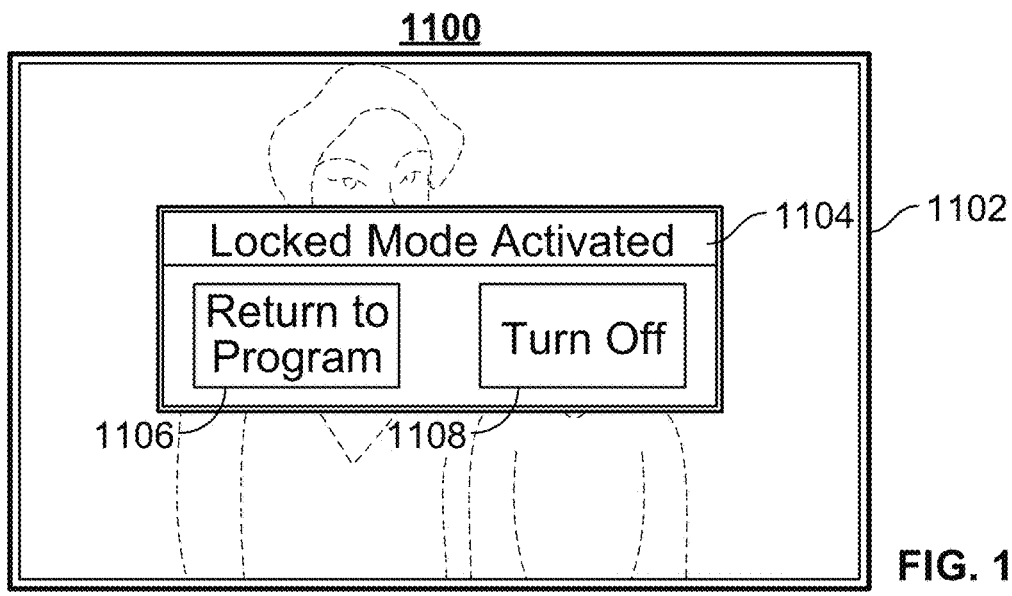
FIG. 11 is a diagram of a first display relating to a locked mode for viewing media assets in accordance with some embodiments of the disclosure.

FIG. 11 is a diagram of a first display 1100 relating to a locked mode for viewing media assets, e.g., media asset 1102, in accordance with some embodiments of the disclosure. A parent may activate the interactive media guidance application's locked mode for a child to view media assets suitable for the child while the parent is unavailable to supervise the child. The interactive media guidance application may determine (e.g., via control circuitry 304 (FIG. 3)) media assets suitable for the child based on media assets viewed by other users, e.g., other children, having characteristics similar to the child. The parent may activate the locked mode to limit viewing of appropriate media assets by the child to a specified period of time. The interactive media guidance application may lock out other functionality as well while the locked mode is activated. If the child tries to switch to another channel or another media source, the interactive media guidance application may generate (e.g., via control circuitry 304 (FIG. 3)) for display an option menu 1104. Option menu 1104 may allow the child to return to the media asset being viewed via option 1106. Option menu 1104 may allow the child to turn off the user equipment device (e.g., user equipment 402, 404, and/or 406 (FIG. 4)) via option 1108.

Figure 12:
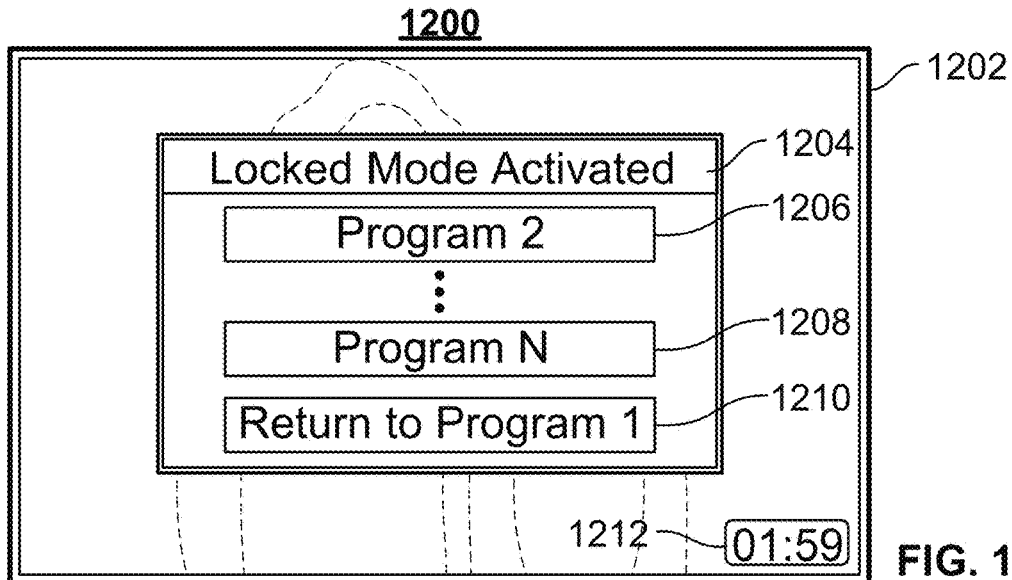
FIG. 12 is a diagram of a second display relating to a locked mode for viewing media assets in accordance with some embodiments of the disclosure.

FIG. 12 is a diagram of a second display 1200 relating to a locked mode for viewing media assets, e.g., media asset 1202, in accordance with some embodiments of the disclosure. The interactive media guidance application may connect to a remote server (e.g., media content source 416 or media guidance data source 418 (FIG. 4)) to retrieve information regarding suitable media assets for the child. The interactive media guidance application may request media assets viewed by other users having characteristics similar to the child's characteristics. For example, the interactive media guidance application may receive information (e.g., via communications network 414 (FIG. 4)) regarding media assets suitable for the child from a remote server:

Program 1, channel "Cartoon Network"
Program 2, channel "National Geographic"
. . .
Program N, channel "ABC"

In this example, the interactive media guidance application may only respond to commands to change between programs 1-N via options menu 1204. The interactive media guidance application may receive a program selection from the child via options 1206, 1208, and 1210. The child may select one of options using, e.g., the remote control for the user equipment device. The interactive media guidance may disable other functionality to prevent the child from viewing media assets other than those received from the remote server. The interactive media guidance application may generate for display a time indicator 1212 for the time remaining in the time period specified by the parent. After the specified time period is over, the interactive media guidance application may power off the user equipment device, e.g., so the child may complete their homework.

Figure 13:
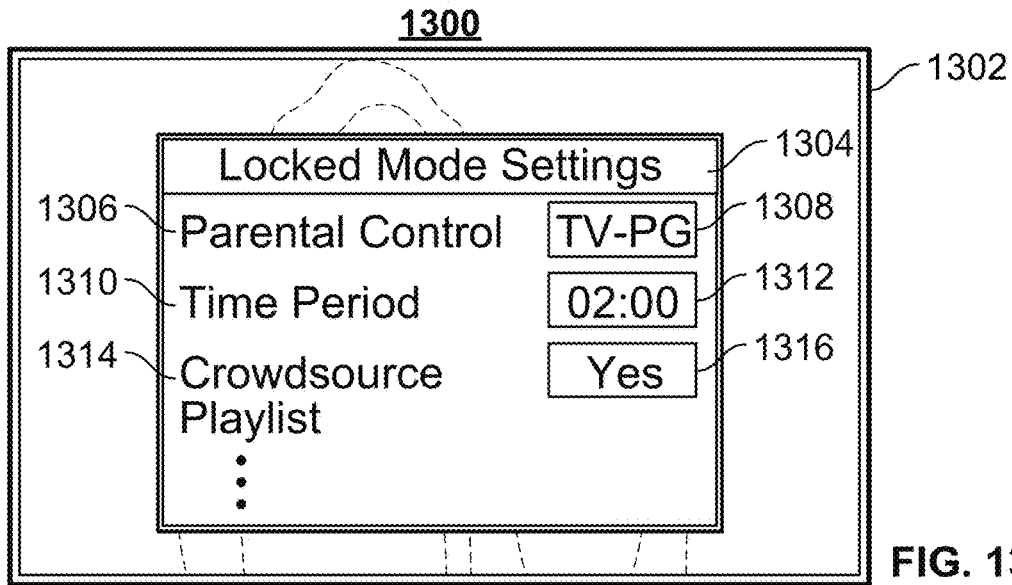
FIG. 13 is a diagram of a third display relating to a locked mode for viewing media assets in accordance with some embodiments of the disclosure.

FIG. 13 is a diagram of a third display 1300 relating to a locked mode for viewing media assets, e.g., media asset 1302, in accordance with some embodiments of the disclosure. For example, a parent may need to leave their child unsupervised while they leave their home to run errands. Before the parent activates the locked mode to present media assets to their child, the parent may specify settings for the locked mode via settings menu 1304. The parent may specify a period of time after which the interactive media guidance application restricts access to the user equipment device via option 1310. In this example, the parent has specified the period of time as two hours (1312). For example, the interactive media guidance application may turn off the user equipment device after the specified period of time is over. The parent may have instructed the child to complete their homework after finishing the media content being presented. The parent may enforce that by having the interactive media guidance application turn off the user equipment device so the child cannot continue watching media content against the parent's wishes.

The interactive media guidance application may crowd-source information regarding suitable media assets for the child to view based on media assets viewed by other users having characteristics similar to the child. The parent may activate the crowd-sourcing process via option 1314. In this example, the parent has activated the crowd-sourcing process (1316). The interactive media guidance application may retrieve characteristics of the user from a user profile. For example, the characteristics of the user may include age, gender, favorite programs, and other suitable characteristics. The parent may specify a parental control rating in the child's user profile to assess suitability of media assets. In this example, the parent has specified via parental control option 1306 that the media assets be rated TV-PG or lower (1308). As such, the parent may specify that TV-PG is the appropriate rating for media assets for display in the locked mode even though a media asset with a higher rating may be considered generally suitable for a child of similar age and/or having other similar characteristics.

By providing the parent with the locked mode option, the interactive media guidance application allows the parent to have peace of mind that their child is viewing media content suitable for their age without having to predetermine which particular media assets the child should view. The parent is free from monitoring the child and need not be concerned about the child watching inappropriate content. Additionally, the interactive media guidance application provides the parent control over the entire time period the child spends viewing media content so that, if desired, the parent can determine the suitable amount of time the child should spend viewing the media assets. The parent has the liberty to control the amount of time the child spends viewing the media assets even if the parent is absent at that time.

Figure 14:
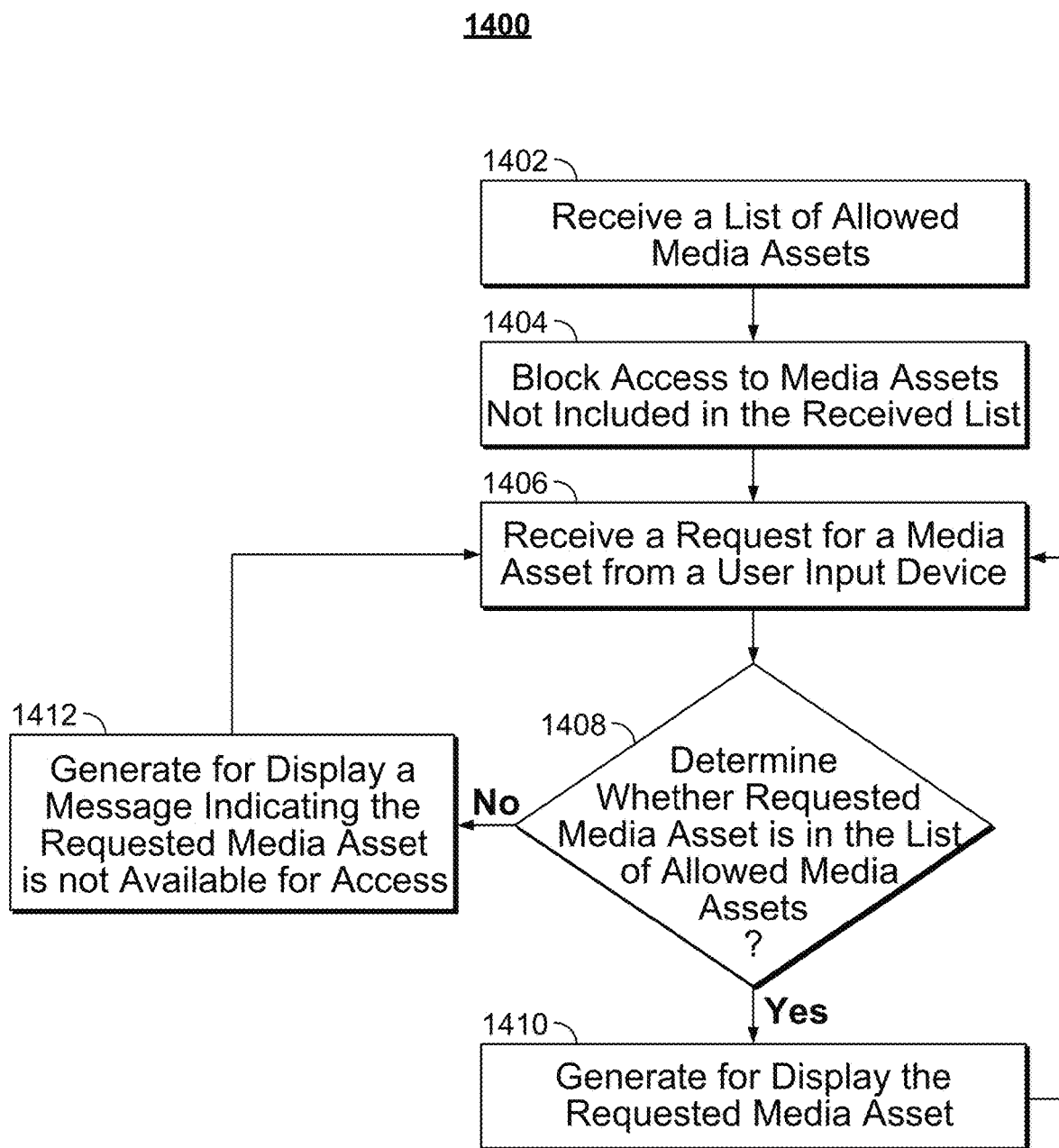
FIG. 14 is a flowchart of an illustrative process for allowing access to only certain media in accordance with some embodiments of the disclosure.

FIG. 14 is a flowchart of an illustrative process 1400 for allowing access to only certain media in accordance with some embodiments of the disclosure. It should be noted that process 1400 or any step thereof could be performed on, or provided by, any of the devices shown in FIGS. 3-4. For example, process 900 may be executed by control circuitry 304 (FIG. 3) as instructed by a media guidance application implemented on user equipment 402, 404, and/or 406 (FIG. 4). In addition, one or more steps of process 1400 may be incorporated into or combined with one or more steps of any other process or embodiment (e.g., FIGS. 5-10).

At step 1402, the media guidance application receives (e.g., via control circuitry 304 (FIG. 3)) a list of allowed media assets (e.g., from storage 308 (FIG. 3) and/or any location accessible via communications network 414 (FIG. 4)) for the user. For example, the interactive media guidance application may connect (e.g., via control circuitry 304 (FIG. 3)) to a remote server (e.g., any location accessible via communications network 414 (FIG. 4)) to retrieve information regarding allowed media assets for a child user based on media assets viewed by other children having characteristics similar to the child. In some embodiments, the list of allowed media assets is modified by a user of the user equipment device, e.g., a parent, via a settings screen similar to the setting screen discussed in FIG. 13. The list of allowed media assets is updated at the user equipment device every time a modification is made by the parent.

At step 1404, interactive media guidance application blocks (e.g., via control circuitry 304 (FIG. 3)) access to media assets available for viewing on the user equipment device (e.g., user equipment 402, 404, and/or 406 (FIG. 4)) but not included in the received list of allowed media assets. For example, the list of allowed media assets may include the media assets, "Tom and Jerry," "News," and "America's Funniest Home Videos." The interactive media guidance application blocks all media assets available on the user equipment device but not included in the list.

At step 1406, the interactive media guidance application (e.g., via control circuitry 304 (FIG. 3)) receives a request for a media asset from a user input device for the user equipment device (e.g., user equipment 402, 404, and/or 406 (FIG. 4))). For example, the interactive media guidance application may receive a request to view media asset "Tom and Jerry" from a remote control for the user equipment device.

At step 1408, the interactive media guidance application determines (e.g., via control circuitry 304 (FIG. 3)) whether the request media asset is included in the list of allowed media assets. If the requested media asset is present in the list of allowed media assets, the interactive media guidance application proceeds to step 1410. At step 1410, the interactive media guidance application generates for display (e.g., via control circuitry 304 (FIG. 3)) the requested media asset. If the requested media asset is not present in the list of allowed media assets, the interactive media guidance application proceeds to step 1412. At step 1412, the interactive media guidance application generates for display (e.g., via control circuitry 304 (FIG. 3)) a message indicating the requested media asset is not available for access. For example, the interactive media guidance application may generate a screen similar to FIG. 11 or FIG. 12 to indicate that the locked mode is activated and present options for media assets other than the requested media asset.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 14.

In some embodiments, the interactive media guidance application collects statistics (e.g., via control circuitry 304 (FIG. 3)) about media content and duration of media content being watched on a weekly or monthly basis. For example, while the parent is present to monitor the child's viewing, the interactive media guidance application can collect (e.g., via control circuitry 304 (FIG. 3)) information regarding media assets that are suitable for the child to view. For example, suitable media assets may include "Tom and Jerry," "News," and "America's Funniest Home Videos." The statistics may also include information on duration of time spent on viewing the media assets. For example, in a given week the child may have viewed "Tom and Jerry," "News," and "America's Funniest Home Videos" for 10 hours, 4 hours, and 9 hours, respectively. This information may be uploaded to the remote server along with the child's characteristics from the user profile. Information collected from multiple user equipment devices can be retrieved when another parent wishes to crowd-source information regarding media assets suitable to present to their child for viewing in the interactive media guidance application's locked mode.

In some embodiments, the interactive media guidance may implement (e.g., via control circuitry 304 (FIG. 3)) a locked mode for viewing media assets suitable for elderly people in accordance with the embodiments described above with respect to FIGS. 1-14. It may be difficult for elderly people to remember channels or timings for their favorite programs. Alerts to tune to certain channels on their television or mobile device may still be a challenge for the elderly. The interactive media guidance application may create (e.g., via control circuitry 304 (FIG. 3)) a playlist of an elderly person's favorite programs based on their user profile. Additionally, the interactive media guidance application may crowd-source information (e.g., via control circuitry 304 (FIG. 3)) regarding suitable media assets for the elderly person to view based on media assets viewed by other users having characteristics similar to the elderly person. The interactive media guidance application may receive (e.g., via control circuitry 304 (FIG. 3)) information regarding media assets suitable for the elderly person in a manner similar to the information received in the example for the child discussed above. In this example, the interactive media guidance application may respond (e.g., via control circuitry 304 (FIG. 3)) to commands received from the remote server to tune the channel to the elderly person's favorite programs at their preset times according to the received information. The elderly person or a family member may activate the interactive media guidance application's locked mode for the elderly person to view media assets without needing to tune to another television channel or to change to another source for the media assets they wish to view.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:
1. A method comprising:
   receiving a first input to initiate a locked mode on a media device;
   in response to the receiving of the first input, initiating the locked mode on the media device;

receiving a second input to request a media asset while the media device is in the locked mode;

determining whether the second input is associated with a restricted user profile;

in response to the determining that the second input is associated with the restricted user profile, determining that metadata of the requested media asset is similar to metadata of the media asset consumed via the media device when an unrestricted user was present; and in response to the determining that the metadata of the requested media asset is similar to the metadata of the media asset consumed via the media device when the unrestricted user was present, generating for output the requested media asset in the locked mode on the media device.

2. The method of claim 1, comprising:

collecting information about consumption of the media asset and/or the restricted media asset associated with the restricted user profile.

3. The method of claim 2, wherein the information includes a duration of time that the media asset and/or the restricted media asset is being watched on a periodic basis.

4. The method of claim 2, wherein the information includes a suitability of the content item.

5. The method of claim 1, comprising:

collecting information about consumption of the media asset and/or the restricted media asset associated with the restricted user profile; and collecting information about consumption of the media asset and/or the restricted media asset associated with a plurality of restricted user profiles.

6. The method of claim 5, wherein the information includes a duration of time that the media asset and/or the restricted media asset is being watched on a periodic basis.

7. The method of claim 5, wherein the information includes a suitability of the content item.

8. The method of claim 5, comprising:

comparing the information associated with the restricted user profile and the information associated with a plurality of restricted user profiles;

identifying a recommended media asset based on the comparing; and generating for display the recommended media asset.

9. The method of claim 1, wherein the determining when the unrestricted user was present includes monitoring access to content by the unrestricted user and/or interactions of the unrestricted user with a guidance application.

10. The method of claim 1, comprising:

in response to not determining the presence of the unrestricted user profile, generating for display a message indicating the media asset and/or the restricted media asset is not available.

11. A system comprising:

circuitry configured to:

receive a first input to initiate a locked mode on a media device;

in response to the receiving of the first input, initiate the locked mode on the media device;

receive a second input to request a media asset while the media device is in the locked mode;

determine whether the second input is associated with a restricted user profile;

in response to the determining that the second input is associated with the restricted user profile, determine that the metadata of the requested media asset is similar to metadata of the media asset consumed via the media device when an unrestricted user was present; and in response to the determining that the metadata of the requested media asset is similar to the metadata of the media asset consumed via the media device when the unrestricted user was present, generate for output the requested media asset in the locked mode on the media device.

12. The system of claim 11, wherein the circuitry is configured to:

collect information about consumption of the media asset and/or the restricted media asset associated with the restricted user profile.

13. The system of claim 12, wherein the information includes a duration of time that the media asset and/or the restricted media asset is being watched on a periodic basis.

14. The system of claim 12, wherein the information includes a suitability of the content item.

15. The system of claim 11, wherein the circuitry is configured to:

collect information about consumption of the media asset and/or the restricted media asset associated with the restricted user profile; and collect information about consumption of the media asset and/or the restricted media asset associated with a plurality of restricted user profiles.

16. The system of claim 15, wherein the information includes a duration of time that the media asset and/or the restricted media asset is being watched on a periodic basis.

17. The system of claim 15, wherein the information includes a suitability of the content item.

18. The system of claim 15, wherein the circuitry is configured to:

compare the information associated with the restricted user profile and the information associated with a plurality of restricted user profiles;

identify a recommended media asset based on the comparing; and generate for display the recommended media asset.

19. The system of claim 11, wherein the determining when the unrestricted user was present includes monitoring access to content by the unrestricted user and/or interactions of the unrestricted user with a guidance application.

20. The system of claim 11, wherein the circuitry is configured to:

in response to not determining the presence of the unrestricted user profile, generate for display a message indicating the media asset and/or the restricted media asset is not available.

\* \* \* \* \*